Feb. 12, 1957 W. GEFFCKEN ET AL 2,781,411
PROCESS AND APPARATUS FOR PURIFYING GLASS
Filed June 4, 1954
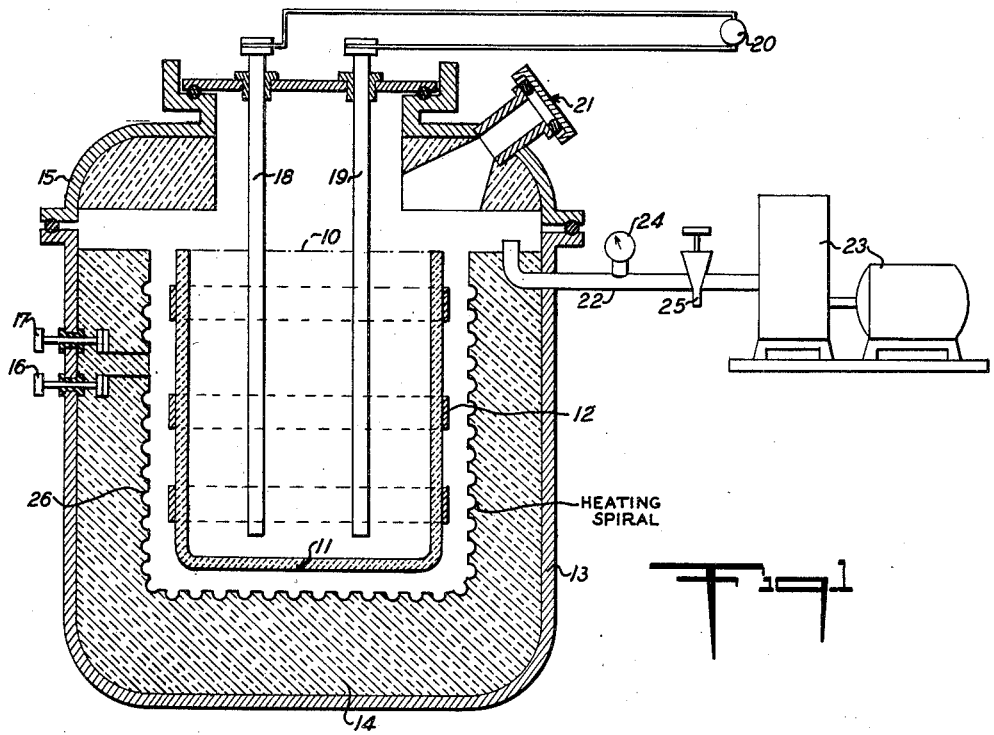
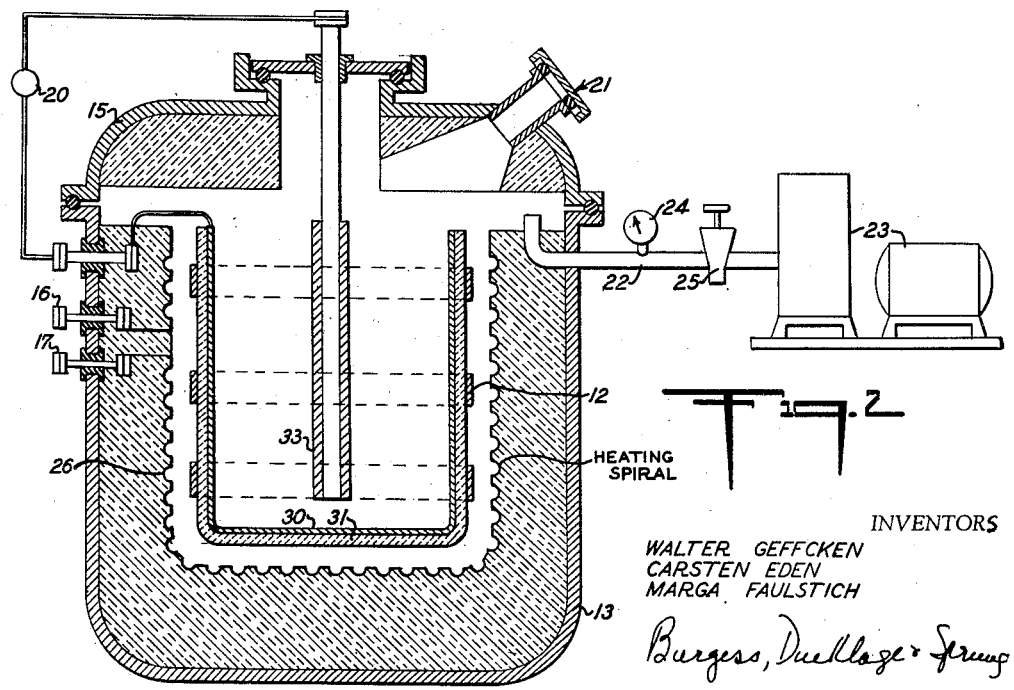
INVENTORS
WALTER GEFFCKEN
CARSTEN EDEN
MARGA FAULSTICH
ATTORNEY

United States Patent Office 2,781,411
Patented Feb. 12, 1957

2,781,411

PROCESS AND APPARATUS FOR PURIFYING GLASS

Walter Geffcken, Carsten Eden, and Marga Faulstich, Mainz, Germany, assignors to Jenaer Glaswerk Schott & Gen., Mainz, Rhineland-Pfalz, Germany Application June 4, 1954, Serial No. 434,651

Claims priority, application Germany June 10, 1953

9 Claims. (Cl. 13—31)

This invention refers to a process of purifying or refining glass. Processes of this kind so far known are based upon raising the temperature of the glass melt and inducing a vehement formation of gas in the melt. Such processes, however, do not suffice for technical requirements because first, they take very long and second, because some glasses cannot be sufficiently purified at all in this way. In addition, a frequent trouble is that glasses so treated and which appear refined, form new bubbles in subsequent operations.

In order to overcome these drawbacks, it has been tried to carry out the refining in a vacuum, in order so to stimulate the development of gases. These attempts, however, failed because the heat transfer to the glass batch could not be adequately controlled, inasmuch as the glass was heated from the outside of a ceramic crucible containing the glass, so that the heat had to be transmitted to the melt through this crucible. The relatively slow heat transfer so obtained did not make it possible to induce in the glass that exact temperature at which the bubbles escape easily on the one hand, while on the other no boiling over of the glass occurs.

These disadvantages can be eliminated in accordance with the invention by generating a vacuum above the glass melt while simultaneously an electric current is passed through the melt by means of electrodes. In this way, heat is generated by the Joule effect directly in the melt, and can be introduced into it at any speed and rate by governing the current input at the electrodes.

The process takes place as follows:

The glass is melted down at normal pressure. Upon attainment of the desired purifying temperature of the glass melt by the Joule heating, the pressure is lowered to from 0.70 to 0.95 atm. In this way, a vehement development of gas results, the intensity of which is regulated by adjusting the pressure so that the glass just does not boil over. Through a window provided in the vacuum furnace containing the crucible, the refining process can be continually observed because the external temperature of the furnace remains sufficiently low.

Purification is completed when the melt no longer gives off bubbles, a condition which will be attained in from a quarter to half an hour. A further advantage of the process of this invention and one which is conditioned by the generation of the heat directly inside the melt is that if a ceramic melting or protective crucible is provided, this crucible can be reinforced with non-scaling steel, inasmuch as its external temperature remains so low as to lengthen the life of the crucible materially.

If the melt is contained in an electrically conductive crucible, then this crucible can be used as an electrode. The electrodes consist to advantage of a material which does not form gases when in contact with the melt at the necessary purifying temperature. Examples of such materials are molybdenum, tungsten, and the platinum metals or their alloys.

In order to prevent atomization of the electrode material, it is best to employ A. C. of over 500 cycles. In the case of optical glasses, for instance, A. C. of at least 1000 cycles is required.

In addition to the Joule effect heat generated within the glass and in further elaboration of the process, the melt can also be heated from the outside. If a ceramic melting or protective crucible is provided, it is best to hold the external temperature under 1200° C. in order to admit of reinforcing the crucible.

A further advantage of the process is that by reason of the Joule effect heating, powerful convection currents arise in the melt thereby continually causing other portions of the fluid glass to come to the surface. As is well known, bubbles expand and escape much more easily at the surface than in deeper zones, where a greater hydrostatic pressure rests upon them. In this way, purification is materially speeded up. The process can be further improved by stirring the melt by means of a vane type agitator hermetically sealed against the furnace. The apparatus to carry out the procedure is depicted in the drawing; Fig. 1 shows one form of construction and Fig. 2 a second form of construction.

The glass melt 10 to be refined is contained in a crucible 11. Crucible 11 is provided with steel reinforcements 12. Crucible 11 is arranged in a vacuum chamber 13 which is lined with insulating material 14 and has a cover 15. In the insulating material 14 a heating spiral 26 is provided with connections at 16 and 17. Through cover 15, electrodes 18 and 19 are conducted which are connected to a source of current 20 and extend into the glass melt. Cover 15 has an observation window 21. The interior of chamber 13 is connected with a vacuum pump 23 through a pipe 22. A pressure gauge 24 and an air-inlet valve 25 are connected with pipe 22.

The mode of operation of the device is as follows:

If a voltage is applied to the electrodes 18 and 19 a current flows thru the melt 10, heating the melt directly. This heating can be supplemented by sending a current through the heating spiral 26. If, following this, a vacuum is created over the melt by activating pump 23, the melt begins to froth intensively. The formation of bubbles can be observed through window 21 and the formation can be regulated by switching the source of current 20 on and off and by activating valve 25 and pump 23.

In Fig. 2 the crucible 30 is made of platinum. Around the crucible 30 a protection pot 31 is arranged which is provided with steel reinforcements 12 as in Fig. 1. Instead of the two electrodes 18 and 19 only one electrode 33 is provided which is connected with the source of current 20. Platinum crucible 30 serves as a counter electrode. The crucible 30 is connected with the other pole of the source of current 20. The other parts are the same as in Fig. 1. The same applies to the mode of operation; it is as described for Fig. 1.

We claim:

1. Process for purifying glass comprising the steps of setting the glass melt under vacuum, while at the same time for heating the melt an electrical current is passed through the melt.

2. Process for purifying glass comprising the steps of setting the glass melt under vacuum, while at the same time for heating the melt an alternating current of at least 500 cps. is passed through the melt.

3. Process for purifying glass comprising the steps of heating the melt from outside, setting the melt under vacuum and at the same time letting pass an electrical current through the melt for heating the melt from inside.

4. Process for purifying glass comprising the steps of heating the melt from outside with a temperature not over 1200° C., setting the melt under vacuum and at the same time letting pass an electrical current through the melt for heating the melt from inside.

5. Process for purifying glass comprising the steps of setting the glass melt under vacuum, while at the same time for heating the melt an electrical current is passed through the melt, and stirring the melt during the refining.

6. Apparatus for purifying glass comprising a crucible containing the melt, an air-tight sealed chamber containing said crucible, means to produce a vacuum in said chamber, electrodes arranged in said crucible to pass an electrical current through said melt.

7. Apparatus as in claim 6, wherein said crucible consists of an electrical conductive material so as to serve as one electrode.

8. Apparatus as in claim 6, wherein said crucible consists of a platinum metal so as to serve as one electrode.

9. Apparatus for purifying a glass melt comprising a crucible of platinum metal air-tight sealed, means to produce a vacuum in said crucible, electrodes arranged in said crucible to produce an electrical current in said melt.

References Cited in the file of this patent

UNITED STATES PATENTS

| | | |
|---|---|---|
| 805,139 | Hitchcock | Nov. 21, 1905 |
| 1,564,235 | Harrington | Dec. 8, 1925 |
| 1,601,523 | George | Sept. 28, 1926 |
| 2,280,101 | Slayter et al. | Apr. 21, 1942 |
| 2,286,903 | Dockerty | June 16, 1942 |
| 2,314,956 | Slayter et al. | Mar. 30, 1943 |

FOREIGN PATENTS

| | | |
|---|---|---|
| 16,541 | Netherlands | July 15, 1927 |